(12) United States Patent
Glover

(10) Patent No.: US 10,832,542 B2
(45) Date of Patent: Nov. 10, 2020

(54) CAMERA SYSTEM AND METHOD

(71) Applicant: Guardifi Security LLC, Tampa, FL (US)

(72) Inventor: Sam Glover, Tampa, FL (US)

(73) Assignee: Guardifi Security, LLC, Tampa, FL (US)

( * ) Notice: Subject to any disclaimer, the term of this patent is extended or adjusted under 35 U.S.C. 154(b) by 0 days.

(21) Appl. No.: 16/600,542

(22) Filed: Oct. 13, 2019

(65) Prior Publication Data

US 2020/0126382 A1   Apr. 23, 2020

Related U.S. Application Data

(60) Provisional application No. 62/748,037, filed on Oct. 19, 2018.

(51) Int. Cl.
| | | |
|---|---|---|
| *H04N 7/18* | (2006.01) | |
| *G08B 13/196* | (2006.01) | |
| *H04W 4/20* | (2018.01) | |
| *G08B 29/16* | (2006.01) | |

(52) U.S. Cl.
CPC ... *G08B 13/19682* (2013.01); *G08B 13/1966* (2013.01); *G08B 13/19619* (2013.01); *G08B 13/19621* (2013.01); *G08B 13/19632* (2013.01); *G08B 13/19656* (2013.01); *G08B 13/19684* (2013.01); *G08B 13/19697* (2013.01); *G08B 29/16* (2013.01); *H04N 7/18* (2013.01); *H04W 4/20* (2013.01)

(58) Field of Classification Search
CPC ............ H04N 7/18; G08B 13/19682; G08B 13/19619; G08B 13/19621; G08B 13/19632; G08B 13/19656; G08B 13/1966; G08B 13/19684; G08B 13/19697; G08B 29/16; H04W 4/20
USPC .................................. 348/65, 143, 81, 373
See application file for complete search history.

(56) References Cited

U.S. PATENT DOCUMENTS

| | | | | |
|---|---|---|---|---|
| 4,346,404 | A * | 8/1982 | Gantenbrink | H04N 5/2252 348/81 |
| 4,750,011 | A * | 6/1988 | Kajiura | H04N 5/2251 348/143 |
| 6,721,501 | B2 * | 4/2004 | Komatsu | B60R 11/04 348/143 |
| 7,520,684 | B2 * | 4/2009 | Ingalls | G08B 13/19623 348/373 |
| 2018/0120826 | A1 * | 5/2018 | Rhim | H04L 41/0866 |

\* cited by examiner

*Primary Examiner* — Trang U Tran
(74) *Attorney, Agent, or Firm* — Chris Tanner; FYPA PLLC

(57) ABSTRACT

A system and method for viewing what person or movement may be at their door via their smartphone, without having to do any destructive installation, is disclosed. The camera system attaches to the typical residential door via adhesive pad anchor which uses a hinge portion to orient the camera system through a peephole within the door. One purpose of the camera system is to enable a user to see what's happening at their door, and be alerted to what's going on outside their door at all times, and/or anytime they want to look.

24 Claims, 13 Drawing Sheets

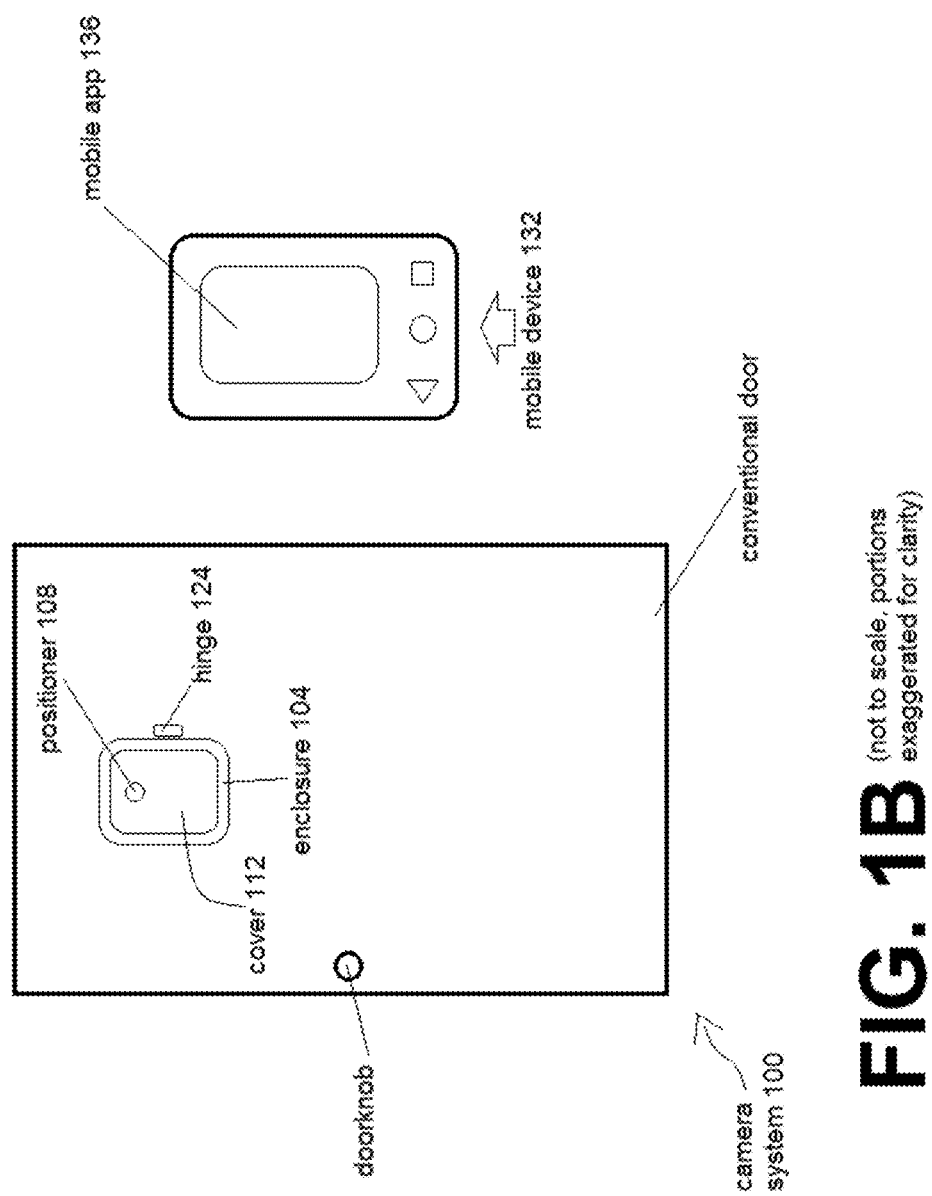
FIG. 1B (not to scale, portions exaggerated for clarity)

FIG. 7B (rotated view based from FIG. 7A)

FIG. 7A (not limited to Android, but Android has familiar icons)

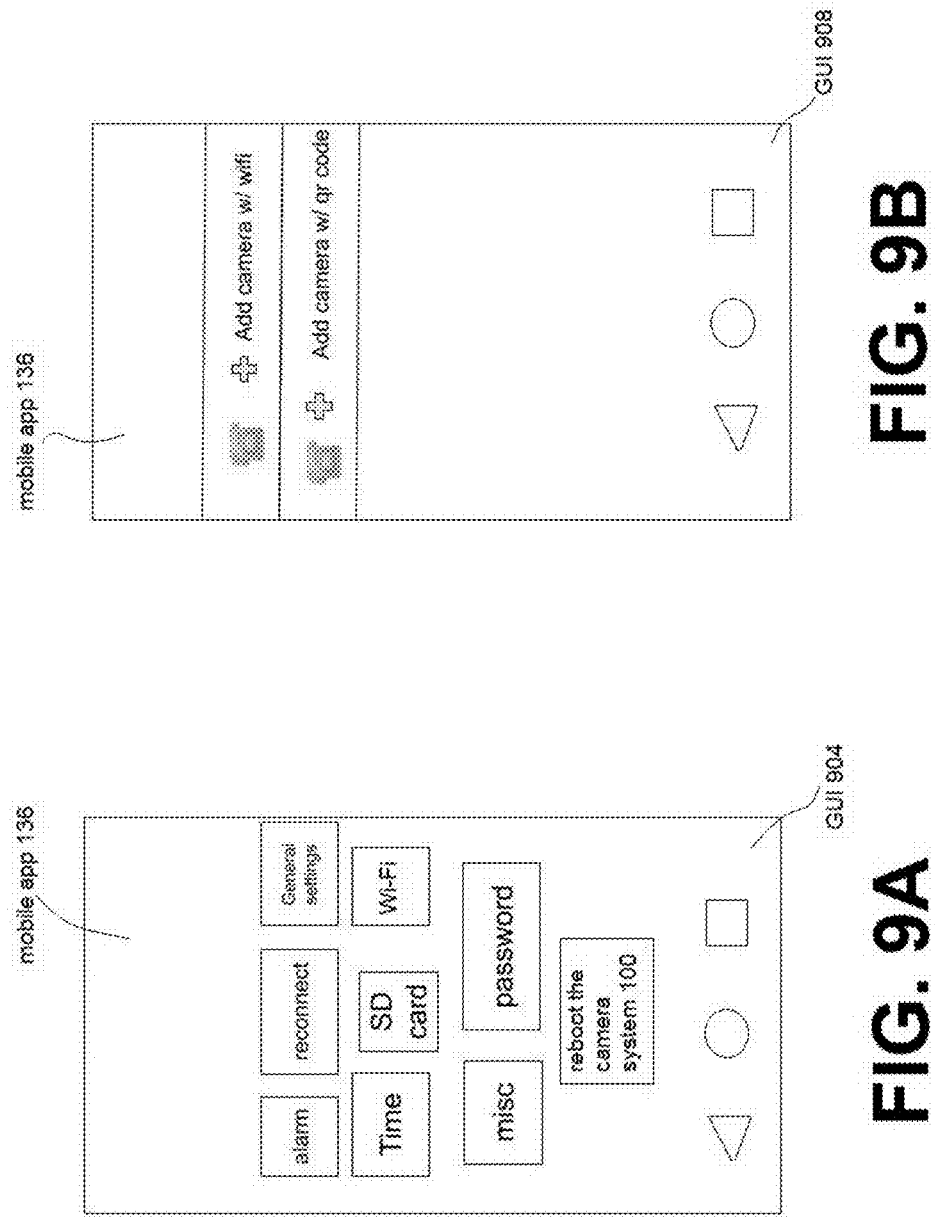

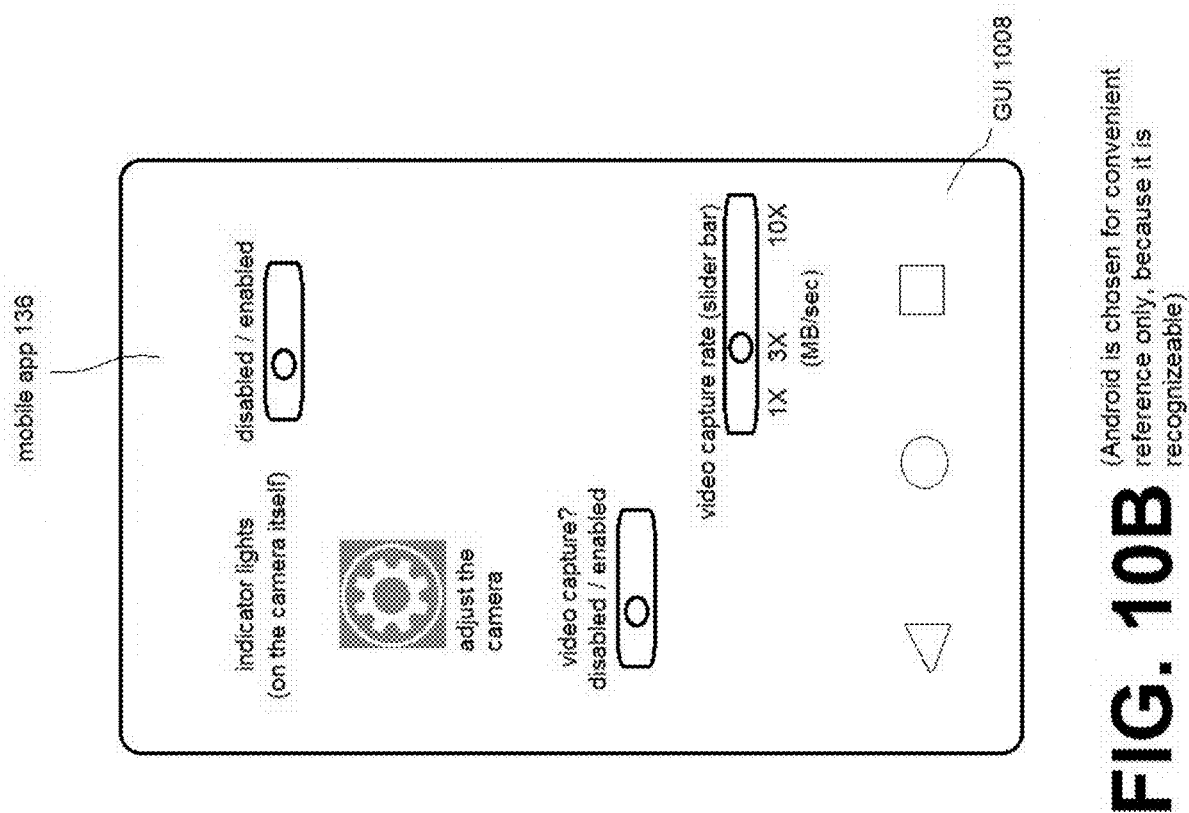
FIG. 10B (Android is chosen for convenient reference only, because it is recognizeable)

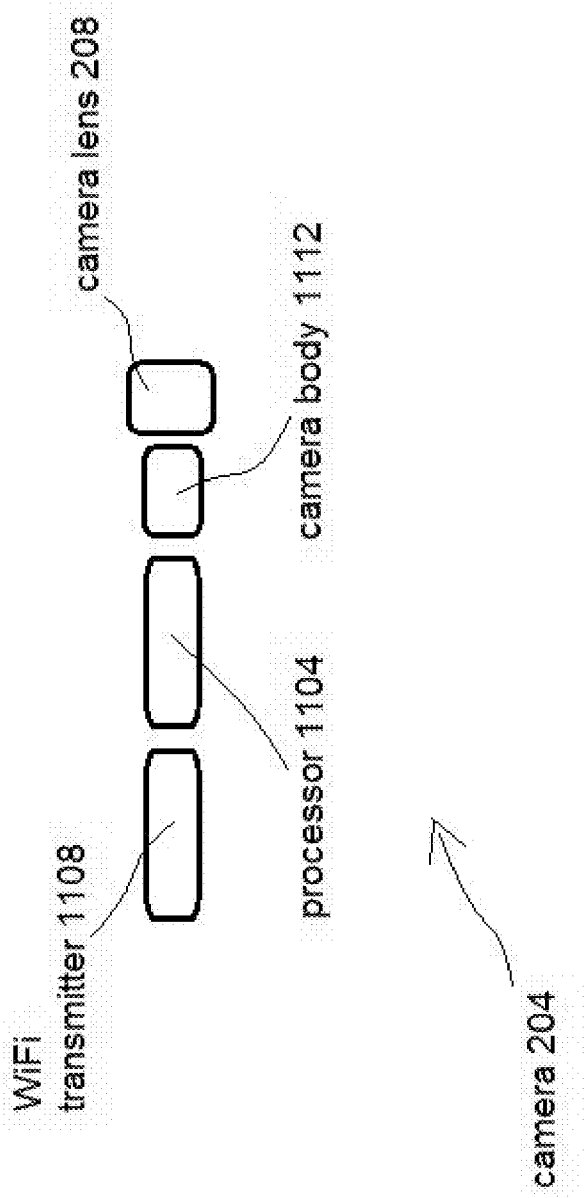

CAMERA SYSTEM AND METHOD

SUMMARY OF THE INVENTION

A system and method for viewing what person or movement may be at their door via their smartphone, without having to do any destructive installation, is disclosed. The device attaches to the door via adhesive pad anchor which uses a hinge portion to orient a camera system 100 through the peephole of a typical residential door. One purpose of the camera system 100 is to enable a user to see what's happening at their door, and be alerted to what's going on outside their door at all times, and/or anytime they want to look.

The camera system 100 is also designed so assist a user in avoiding destructive installation, so they don't have to do any drilling or cutting into the doors of an apartment that they may not own, and thus be at risk of violating their lease. In some cases this activity may be a minor infraction, and outweighed by the increased stability of the camera system 100.

DETAILED DESCRIPTION OF DRAWINGS

FIGS. 1A and 1B show an example embodiment of a camera system attached to a door;

FIGS. 9A-9B and 10A-10B show example GUIs for the mobile app; and

FIG. 11 shows various components of the camera system.

DETAILED DESCRIPTION OF PREFERRED EMBODIMENTS

Figure 1A:
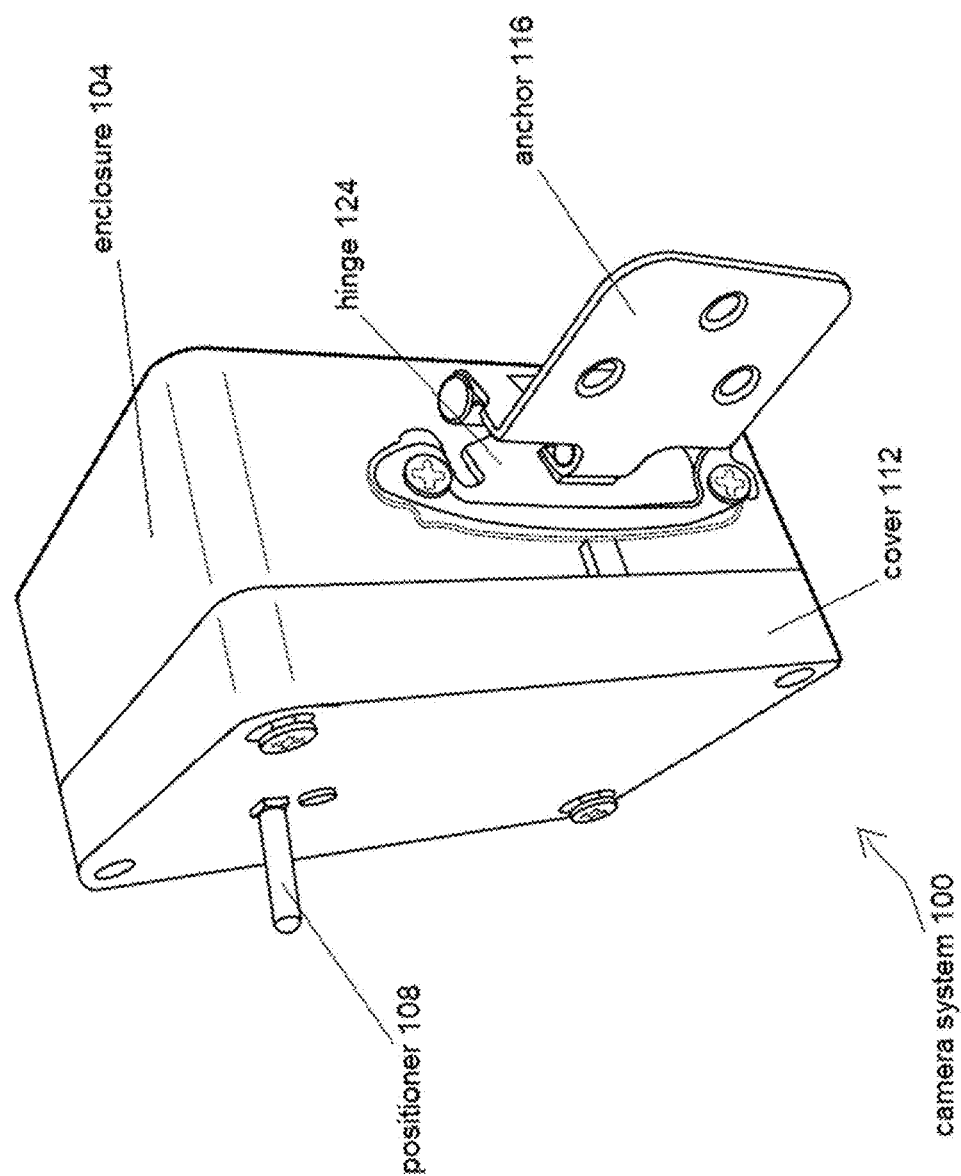
Figure 2:
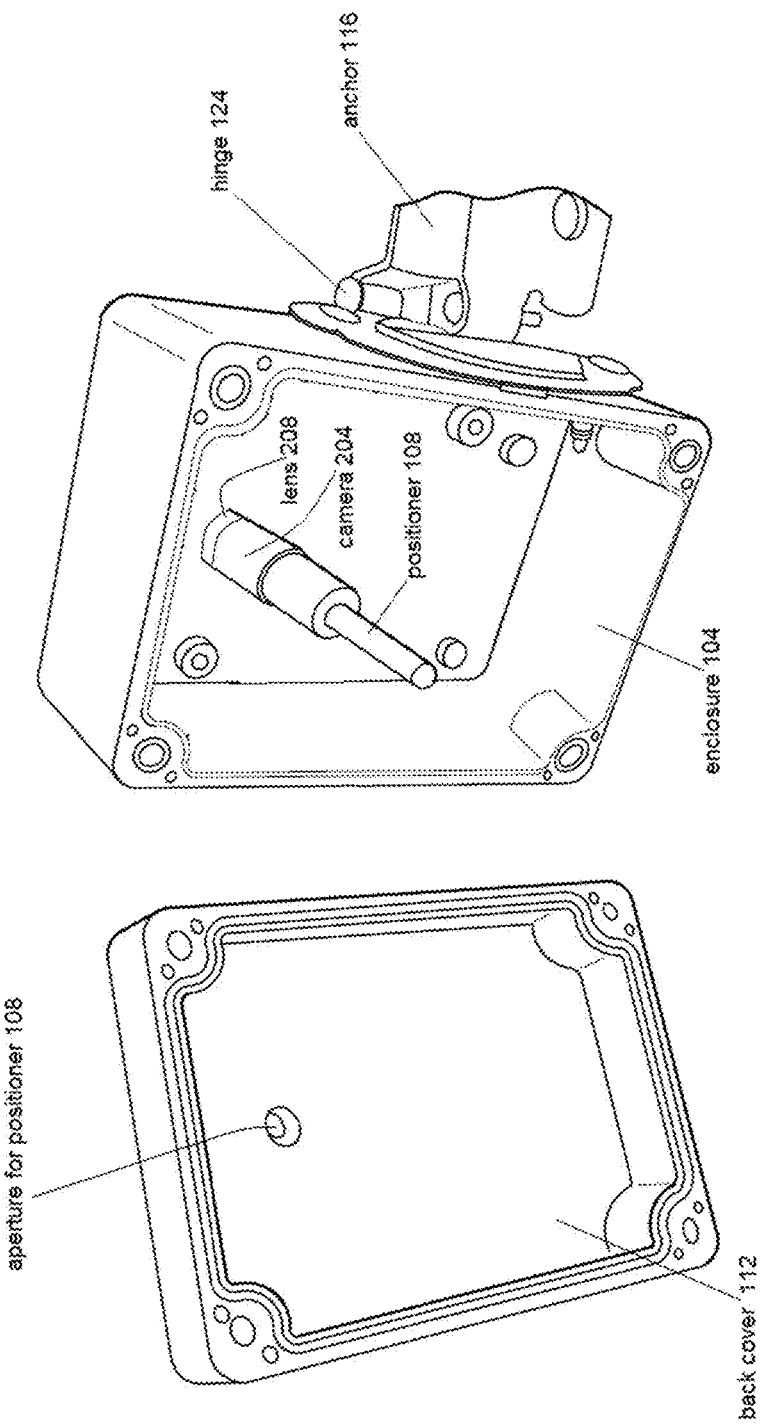
FIG. 2 show detail of the enclosure, including a back cover.

FIGS. 1A and 1B show an example embodiment of a camera system 100, attached to a door. The camera system 100 comprises an enclosure 104 and a positioner 108. A rectangular cover 112 is also present. The enclosure 104 and the anchor 116 are the only parts of the system 100 that actually come in contact with the door. As shown in FIG. 2, a hinge 124 links the enclosure 104 to the anchor 116. In an embodiment, the anchor 116 is attached to the door via an adhesive pad 420 (obscured from view in FIG. 2).

The camera system 100 further comprises a camera 204 and lens 208. These elements are not visible in FIGS. 1A and 1B, but are still important in conveying the function and purpose of the camera system 100. The camera 204 and lens 208 are explained in more detail with respect to other features.

Additionally, when in the open position (with the cover 112 removed), the camera system 100 can be moved to be off to the side, not blocking the peephole, so the user can use the circular cut out to line up the camera properly when installing, or when using the peephole as originally intended (e.g. no camera system 100 involved). One potential drawback of such a configuration might be that when the system 100 is opened and closed, for whatever reasons, re-adjusting the position of the camera 204 using the positioner 108 may be necessary.

As shown in FIG. 1B, the camera system 100 attaches to the inside of the apartment door, orienting the lens 208 of the camera 204 through the peephole of the door, thereby giving the user a view of everything that's happening right outside the door.

Figure 4:
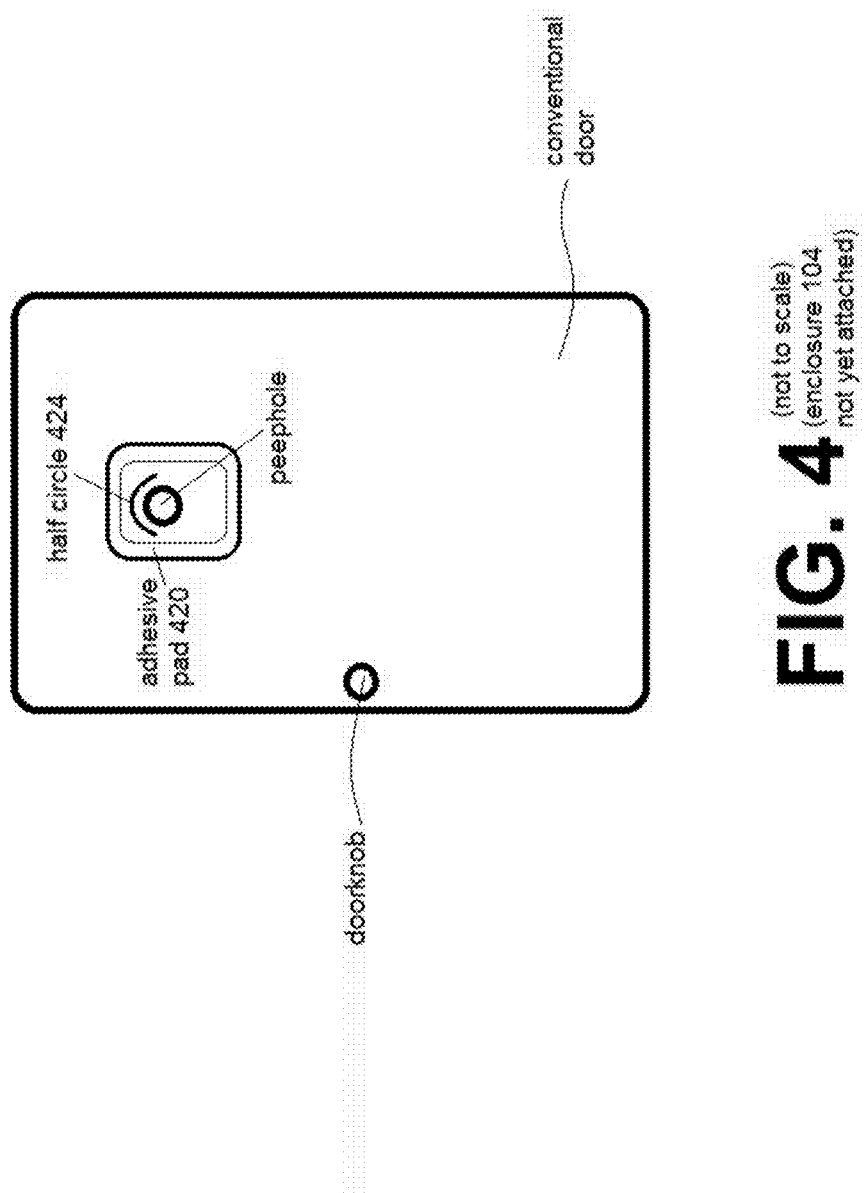
FIG. 4 shows a stage of installation where the enclosure is not yet attached, but where an anchor pad is installed.

The camera system 100 attaches to the door via e.g. an adhesive pad 420 shown in FIG. 4, although other fastening mechanisms can also be used. Screws are also contemplated for fastening to some selected types of doors. In the event use of screws on the door is considered a lease violation, arguably it's a minimal violation that can be rectified at low expense, patched up, etc. Ultimately, for the camera system 100 to be effective, it is advantageous that whatever the specific fastening mechanism, it should be durable and permanent.

The hinge 124 allows users to swivel the enclosure 104 away from the peephole if need be. For example, in the event a user just wants to check to see who is at their door, if that user is nearby the door, that user can ignore their mobile device 132 and quickly just hinge-swing the enclosure 104 out of the way, either outward toward the user or swiveling downward. At this time, a user can just view the peephole in a conventional way, disregarding the camera system 100 entirely, as shown at least within FIG. 5B.

Enclosure 104

FIG. 2 is for example purposes only, so that the embodiments herein should not be considered limiting. For example, in an embodiment, the enclosure 104 can have a side-opening (not shown) for accommodating various components, e.g. an on-off button, charging ports, SD card, USB access or LED status indicator. Also, other more decorative shapes for the enclosure 104 can be used, besides what is shown in FIGS. 1A and 2, so that the cover 112 may not always be rectangular.

The enclosure 104 also provides space for optional local storage e.g. an SD card using e.g. a micro-USB connection. However, a mobile app 136 on a corresponding mobile device 132 can save\archive the motion detection alerts that the camera 204 may trigger and thus be stored on the user's mobile device 132. In this embodiment, a user can be freed from downloading everything off the camera 204 and plugging\unplugging things from the enclosure 104.

In an embodiment, the enclosure 104 is plastic, and uses a locking lip system that has a smaller inner lip on a front (door-facing) casing of the enclosure 104. In an embodiment, a second lip within an outer (rear) casing is a little wider so the two lips clip together, thereby enabling the enclosure 104 to remain closed.

In an embodiment, a front-facing (door-facing) portion of the enclosure 104 has a hole (not shown) that is larger about not little less than about half inch in diameter, which is sized to match up with typical peepholes.

The positioner 108 can get enough grip to adjust the camera 204, push it in, pull it out, to make sure the image on the mobile app 136 is of sufficient quality. The enclosure 104 can also have an LED port (e.g. red/green) to show an in-home user that the system 100 is properly activated and working.

Positioner 108

Figure 3:
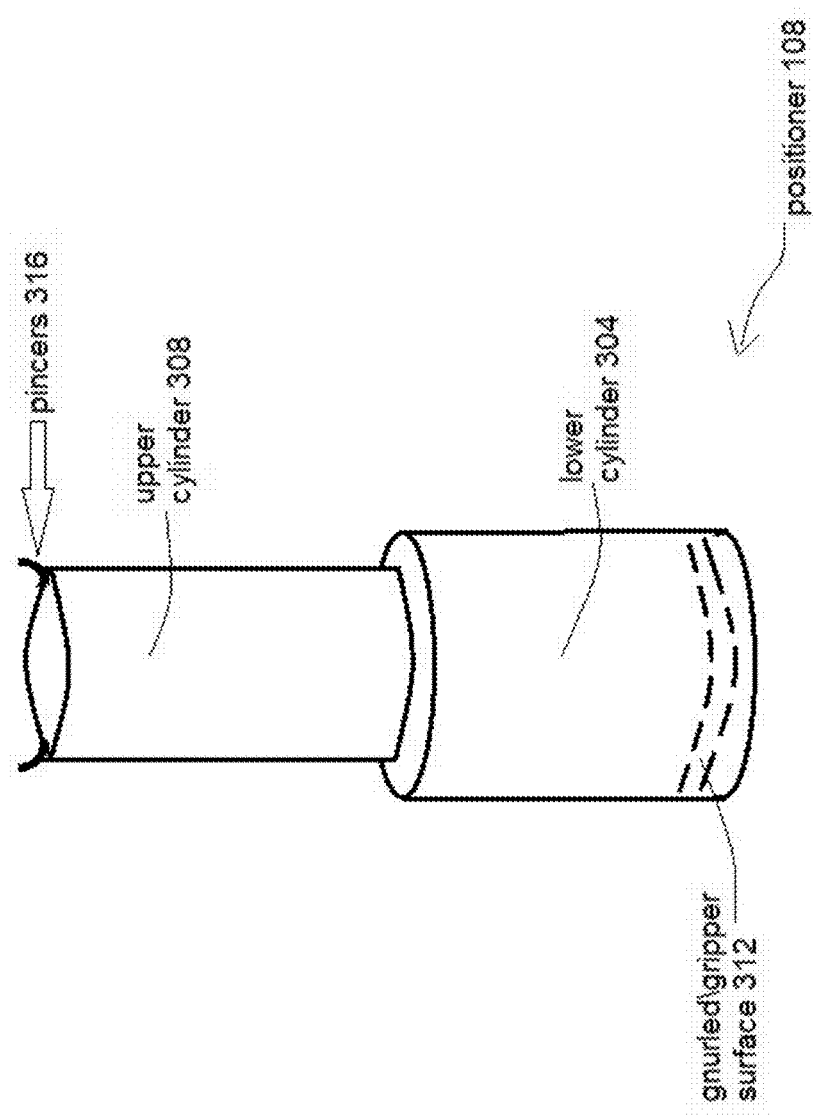
FIG. 3 shows detail about a positioner.

FIG. 3 shows more detail about the positioner 108. As shown in FIG. 3, two concentric separate cylinders lower 304 and upper 308 have frictional surfaces therewithin. Further, it is possible to implement the cylinders 304/308 using various types of plastic-with-memory surfaces, permafoam, and potentially with durable plastics, rubber materials, plastirubbers, that remains pliable and hold their physical position. The plastics, rubber materials, or plastirubbers can be embedded to the base lower cylinder 304 of the positioner, which act to aid in holding and changing the attitude of the positioner 108.

In an embodiment, the positioner 108 can be attached to the camera 204 with adhesive. The positioner 108 can attach to the camera 204 using e.g. suction, micro-velcro, micro hook-loop, magnetic, slide and click, perhaps a very gentle gripping surface, and/or a type of elastic releasable minipincers 316 (FIG. 3) for gripping a camera body 1112.

The positioner 108 attaches to the hardware of the camera 204, for example the camera body 1112. Users adjust the camera lens 208 is to push the cylindrical positioner 108 further into or out of the peephole, or adjust it side to side, to get a better picture. As shown in FIG. 1A, a portion of the positioner 108 pokes out the back of the enclosure body 104 and is gnurled so the user can grasp that gnurled portion 312 to manipulate the camera lens 208.

The positioner 108 exists to ensure that the camera 204 can be moved, repositioned, and can stay in a specific position that is most advantageous to a user. That is, when the user selects a position for the camera 204, that user needs the camera to stay in that position and not wiggle out or slip loose. The embodiments herein have several ways to achieve this. In an embodiment, an outer lining of the positioner 108 is a thin light rubber to increase grip while still allowing the user to insert the camera into standard peepholes. The positioner 108 could also be a single piece of material with one larger lower end 304 for specific attachment to the camera lens and the smaller upper end 308 for the user to grip and physically adjust the camera 204 to improve picture/video quality.

Next, the positioner 108 is used as follows. A user activates their mobile app 136 and has it enabled. Second, that user moves that positioner while viewing their mobile app 136 and checking the image being shown. Third, the user seeks out the best clarity and visibility of the camera 204 from the point of view of the mobile app 136. Once that is achieved, the user stops touching the positioner 108, which should remain in place and hold the camera-positioning selected by the user.

As discussed earlier, it is important that the positioner 108 continue to hold the user's position-selection for the camera 204 long after the user has removed their fingers from the positioner 108. An anti-wiggle effect of the positioner will occur for a variety of reasons, one being the camera 204 fitting snug into the peephole.

Also as stated, the positioner 108 allows locating the camera lens 208 (in an embodiment, a 1080p lens) far into the peephole to give a really high quality picture quality without having to replace an existing peephole. However, an alternate embodiment of the positioner 108 is where the positioner 108 can be moved forward or backward, but this backward-forward motion is controlled by a circular dial instead of a straight gnarled rod as shown in FIG. 3. In this alternative embodiment, a user would turn a dial e.g. clockwise to push the positioner 108 and camera 204 further into the peephole, and turn counter-clockwise to retract the adjuster and camera back toward the body of the enclosure 104.

Connecting the Camera 204

Typically, the camera 204 is an IP camera setup, using e.g. a IP\Wi-Fi camera. The camera 204 itself connects to the apartment or home Wi-Fi router. Installation involves connecting to the home's Wi-Fi using the mobile device 132.

Once properly installed and set up, users sign into the specific camera system 100 linked to their mobile app 136, go to a "device settings" GUI and link the camera 204 to their specific Wi-Fi. Doing so will bring up an interface showing all the Wi-Fi options near to a user's apartment\home. A user can then select their specific Wi-Fi network, and then sign in through that network. The user types in the Wi-Fi password, and then logs on.

It is intended that the specific camera 204 will pop up on a main page of the mobile app 136 because of detecting the connection to its Wi-Fi. Then, a user will select that specific camera system 100 from a list within a menu of available devices and create a password for it. Thus, no one can just look at the video feed from the camera system 100 if they wanted to, and instead can only view that video feed by having the proper Wi-Fi password. Further, even if someone does hack the camera 204, it wouldn't be to detrimental because they'd looking outward into the hallway of a user's building, but not inward into anyone's actual apartment or house.

The camera 204 will then log into the designated Wi-Fi connection, perhaps take a second and half to reboot, and then be connected to the Internet through the known, hopefully secure Wi-Fi connection. The camera has a PIN (numeric PW) the user creates when connecting the camera to Wi-Fi to further secure access. A user can then view the video feed from the camera system 100 remotely via the mobile device 132 located anywhere, so it's not necessary to be directly connected to the camera 204 to view it. This means a user can connect the computer system 100 to a laptop/stationary computer as well. However, for convenient reference, within this disclosure, the example of connecting to a mobile app 136 present on a mobile device 132 will be the primary illustrative embodiment used herein.

Battery

Providing power to the camera system 100 can be done a variety of ways. A variety of options and features are contemplated. There are various battery options. Based on power calculations and camera programming the user could use long term batteries such as a 9 v battery with a 5 v limiter as to not surge the camera 204. Also long lasting rechargeable lithium ion batteries would be an option. A qi (inductive) charger could also be connected to the camera system 100, without needing to open the enclosure 104.

Live Streaming

Live streaming is contemplated for the camera system 100. However, for a battery version that works with just a single battery pack, live-streaming may be less feasible, because of power requirements. Live streaming would be made more feasible for short periods of time based on power calculations and camera programming. It is possible to find a rate at which to pulse the motion sensor while keeping the camera and Wi-Fi in a passive mode until triggered. Doing so can greatly extend battery life.

Motion Detection

In the plug in powered embodiment, the camera 204 is always on and detects motion using resources embedded within the camera system 100. In other embodiments, as shown in FIG. 6, motion detection occurs via a motion detector 604 which is separate from the camera 204.

Thus, it is possible to make the IP camera 204 work with the system battery (not explicitly shown) and a motion detector 604. In an embodiment, the motion detector 604 will go over the top of the door just ever so slightly. A user can change the sensitivity of the motion detector 604. This avoids "false triggers" such as triggering when people are walking by the door, instead targeting situations where someone is at the door or close enough to the door to be of concern.

Figure 6:
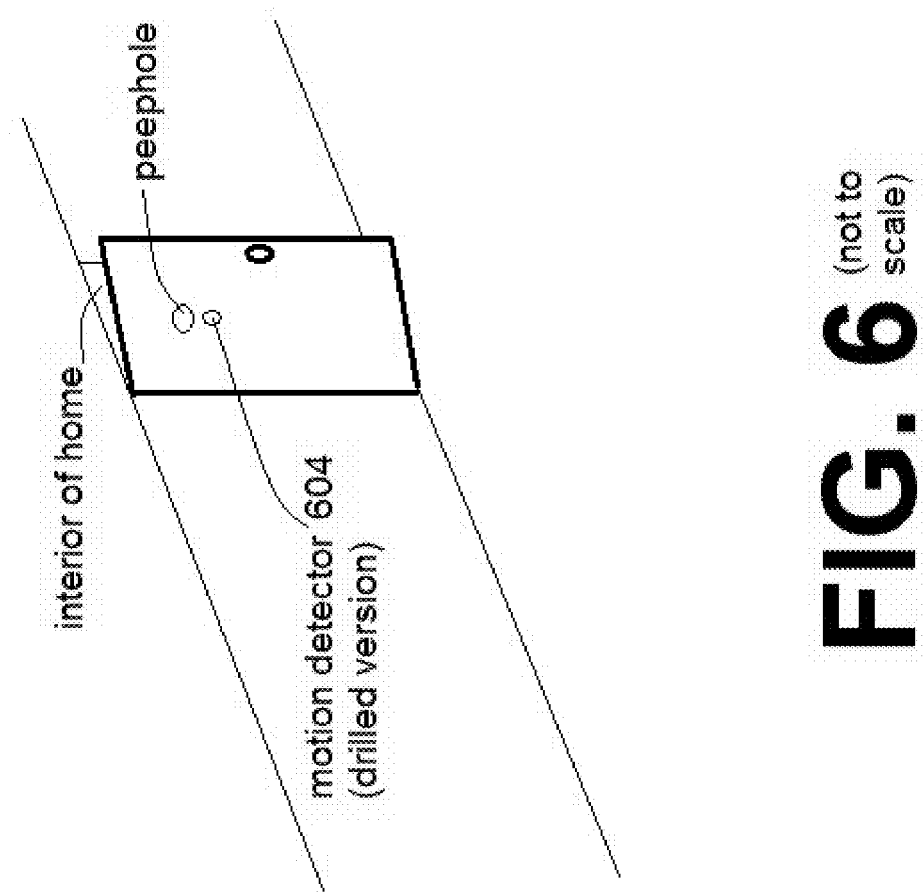
FIG. 6 shows an example motion detection embodiment.

The motion detector 604 may be wired to go over the door, but (as shown in FIG. 6) could also involve penetrating the door, depending on composition of the door, and routing a small wire or group of wires therethrough. The motion detector 604 could trigger on low power, trigger the camera 204 to turn on, quickly snap a picture, send the picture and then put the camera 204 back to sleep mode, just to conserve battery life.

It is possible to set an alert-disabled time period, where the motion detector 604 may trigger but the alerts are masked. Or, where the motion detector 604 is entirely disabled (temporarily) and thus not consuming power. Let's say a user only wants motion detection alerts at certain times and wishes to screen or disable alerts at other times. For example, at night or during the day users don't want motion detection alerts when leaving for work or get back from work. In such a case, set the alarm time up to not pick up motion detection between 7:30-8:30 AM because users may leave for work around those times, and then won't have it pick up (detect) from e.g. 6-7 PM, because that's when users may get home from work and don't want to get spammed with meaningless alerts triggered by person X or roommate Y opening and closing the door a bunch of times.

However, during alert-enabled periods, the camera system 100 will send alerts during the day, via e.g. a push notification. A notification may show up on the mobile app 136 as if it was something like a snapchat or a text, and can say "notification", "motion detection", "alert", or other user-configurable language. Users can click into the alert, open it up, and then if they don't want it, they can swipe to the side and have an option to delete it.

Figure 7:
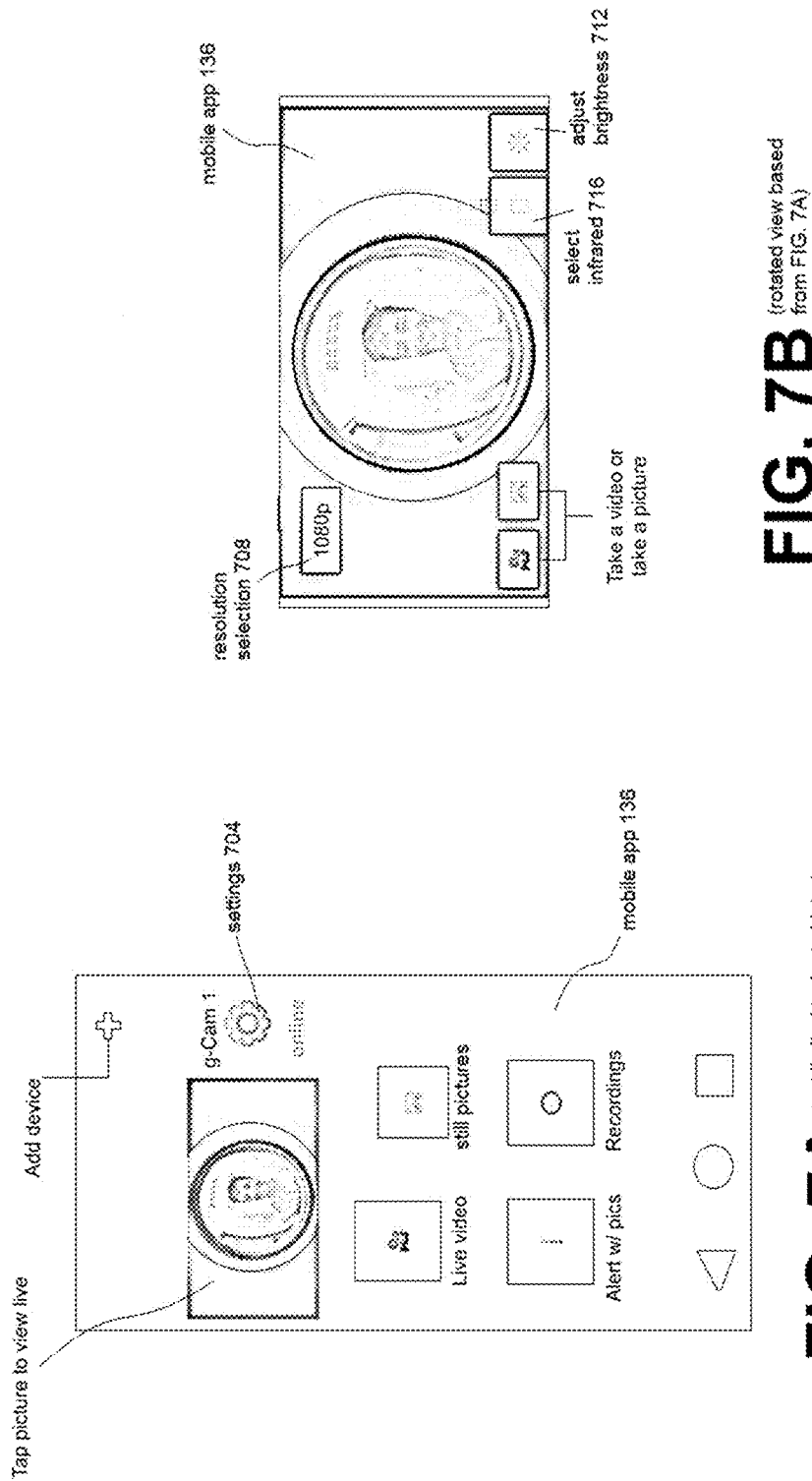
FIGS. 7A and 7B show example GUIs for a mobile app.

As shown in FIG. 7A, by selecting the gear sign 704 next to a given camera system, a user can then to go in and modify the settings for that camera system. For example, as discussed earlier, setting how sensitive the motion detection should be, so as to not get constant alerts anytime someone walks by the door in the hallway. The user thus ensures receiving only the desired alerts. Fine-tune to the point of only generating alerts that are useful, such as when someone comes up to a door, or knocks on a door or drops something off at that door.

An advantage is not triggering alerts based on a neighbor across the hall. Not triggering alerts based on people walking their dog during the day. Only triggering alerts based on people who are coming into a door or doing things near that door. Example, a mailman, or thief.

The camera system 100 can do either still image capture and\or video capture. It is possible to set up the camera system 100 for video capture, but there might be a three second delay, so if the bad/intruder person is quick in their movements, they might escape detection.

Figure 8:
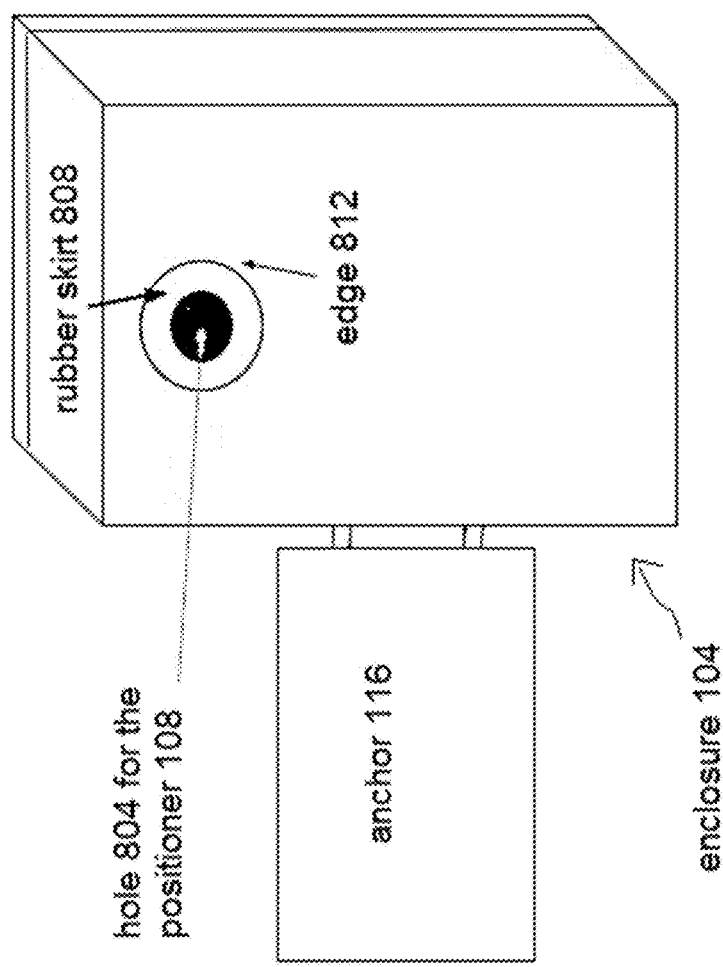
FIG. 8 shows an enclosure with a rubber skirt on an edge of an inner ring.

FIG. 8 shows an enclosure 104 with larger aperture but with a rubber skirt 808 on an edge 812 of an inner ring of the enclosure 104 positioned so that the camera 204 and positioner 108 don't rattle around.

As stated, the system 100 is structured to be configurable, with a wide variety of options and features. However, the installation process is also intended to be simple and intuitive, and not force users to contemplate options and have to answer questions about choices they may not understand. Scenarios (Porch Piracy, Stalking, Paid Wi-Fi Services)

The camera system 100 makes it possible to see when packages are delivered. This assists in reducing "porch piracy", and potentially enables determining exactly who stole a package. Also can assist in reducing threatening behavior. An example exists where a woman lived in an apartment building who had turned down a guy at a bar who knew she had been acquainted with before. He ended up actually just getting back to her apartment before her, and then waiting for her in the hallway. If she had some version of the camera system 100 herein, she would have been able to see that he was right there, and alert building security, perhaps not go home, perhaps summon someone to help her, and/or perhaps summon someone to confront the person.

An additional advantage is issues with outside\exterior cameras being smashed, broken or destroyed by simply weather, or intentionally damaged by someone looking to do harm to property or steal something. As such, the camera system 100 being on the interior of the door makes it unique, and yet the camera system 100 doesn't lose any of the function or image quality that other security cameras have. The camera system 100 can still maintains its e.g. 1080p quality. 1080p refers to a video modes characterized by 1,920 pixels displayed across the screen horizontally and 1,080 pixels down the screen vertically; while the p stands for progressive scan, i.e. non-interlaced.

Next, it is important to note that the camera system 100 uses the same peephole that was present when moved in.

The camera system 100 strives to achieve minimum alteration to the premises where it is installed. Users can take this camera system 100 off their door and in theory, bring it with them. When staying in a hotel, have the camera system 100 present, the same camera system 100, so login is almost the same. Log the camera system 100 into the hotel's Wi-Fi, connect it, and have the same increased security in the hotel as in one's home.

Using a backup battery, single-use mobile phone (subscription fees apply) connected to the Internet and acting as e.g. a Wi-Fi hotspot, it may be possible to not be committed solely to a house/apartment Wi-Fi. After all, Wi-Fi routers sometimes break down. Remote locations could use such an arrangement, such as cabins in woods, remote locations, where Internet connectivity is spotty or intermittent.

The purpose of the camera system 100 is to allow the user to monitor their door activity but doing only minimal installation\alteration to the premises. Don't have to replace the peephole, don't have to hard wire it into homes. Some embodiments are self-powered and not dependent on the electrical grid. All embodiments are designed for ease of use and user-customization.

Specifically, each user's environment will be slightly different. Initial installation will be plug-n-play but with so many options, a balance must be set. The user should not be forced to make choices on options they may not understand, but the more sophisticated user should have changes to configure more complex options. In designing the GUIs and default options, a wide variety of user experience levels are factored in.

Camera monitoring functionality allows the camera system 100 to sit on the inside, not the outside, of the door of a dwelling. The camera system 100 is not vulnerable to weather damage or smashing damage by a criminal or, someone being reckless or, hazardous weather and is very discrete.

As shown in FIG. 11, the camera system 100 is made up of four main components: 1) a camera body 1112, 2) the e.g. 1080p camera lens 208 that attaches via flexible cord power cord to the main circuit board on the circuit board attached as 3) a micro controller (not shown) or e.g. a small processor 1104 that acts as the brain for the camera 204. Most IP cameras come equipped with processor hardware 1104, but some do not. In an embodiment, the processor 1104 takes the signals from the camera body 1112 and puts these out through the 4) Wi-Fi transmitter 1108. The Wi-Fi transmitter 1108 then communicates through the Internet router in the home, which then communicates with the mobile app 136 on the user's phone 132.

The camera system 100 also accommodates environments in which space is very limited. One way to achieve this it to use an endoscope-cam module for the camera 104. Endocams are designed to fit in very small places. For example, an endoscopic camera can be as small as a grain of rice.

Software Description

The mobile app 136 will have a main landing page. Horizontal blocks for each device that users may want to attach. The mobile app 136 has a way to change a user's layout in live video. The top right will have a little plus (+) sign to connect available IP devices to the mobile app 136. At the bottom there will be the live video, which is kind of a home base for the user.

For demonstration purposes, assume a click on the bottom occurred. Doing so brings a user to a main camera list or device list. Snapshots will be screenshots that of what the camera's seeing, snapshot recordings. As shown in FIG. 7A, when watching a live video, a user can select whether to take a recording or take a snapshot. In an embodiment, a 1080p lens is used, which has up to six meters of motion detection.

For the alerts generated by the motion detector 604, a user can go in and set alarm or motion detection alerts settings via e.g. "device settings".

When a user clicks on the small gear next to the device on a list, there will be a sensitivity setting. This sensitivity can be from a 0 to a 10. In the example shown in FIG. 10A, the sensitivity 1012 is set at three, so the motion detector does not needless pass on everything it detects. Instead, it only picks up human activity that is directly in front of the door.

Next, the camera system 100 can also be used for a type of surveillance. For example, verify the activity of a paid dog walker. A user can check the mobile app 136 to check and make sure that a paid dog walker is taking out the dog on time, earning their money.

Figure 10A:
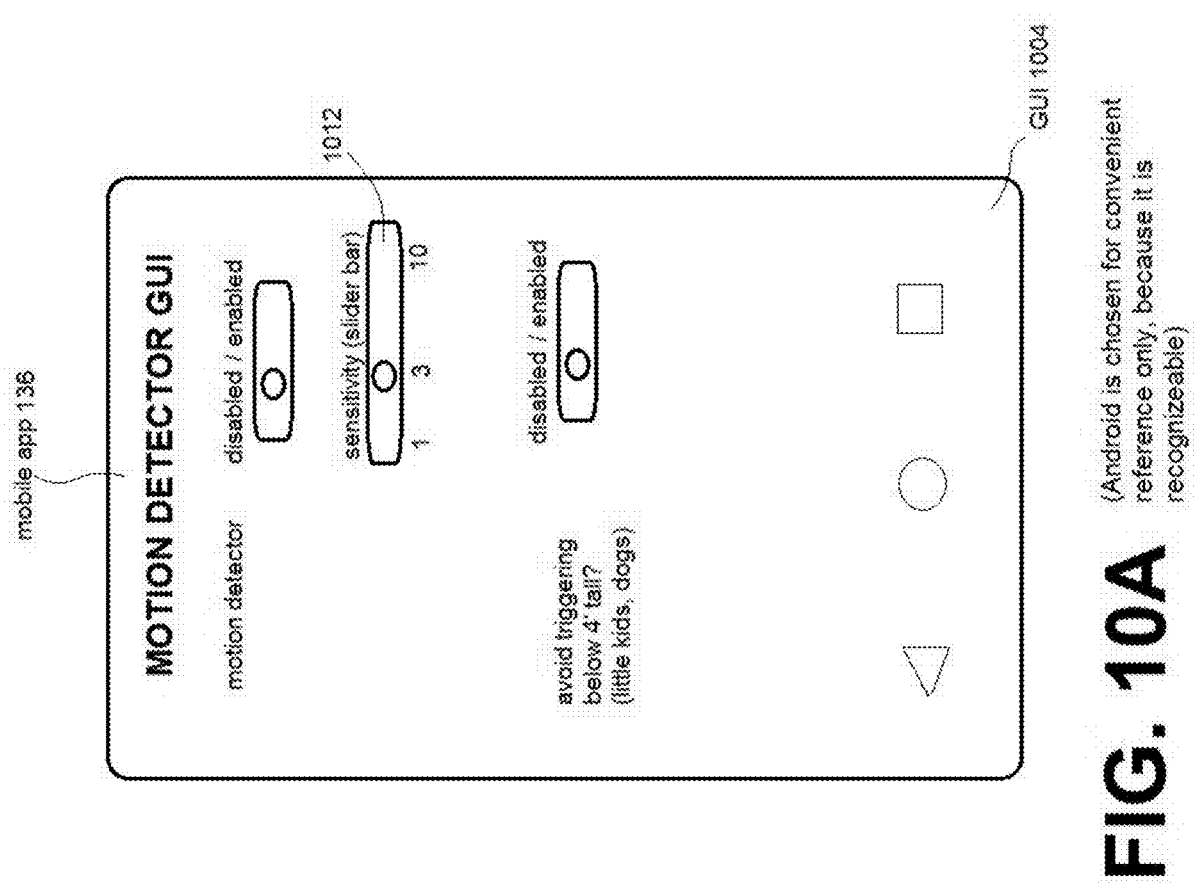

FIGS. 9A-9B and 10A-10B show example GUIs for the mobile app 136. FIG. 9A shows a GUI 904, FIG. 9B shows a GUI 908, FIG. 10A shows a GUI 1004, and FIG. 10B shows a GUID 1008.

As shown in FIG. 7B, the mobile app 136 can be day\night controls to turn on infrared sensitivity, using an interface 716. That's a toggle. Just click once to turn on, click once to turn it off. Brightness settings are also shown in FIG. 7B. A user can tap the brightness button 712, doing so will bring up the scale and then use the slider for a desired brightness. This feature would be helpful for a dark hallway or if there is a lighting problem or if the lighting is too bright right above or across from a door. A user can turn it down a little bit until the white light isn't as glaring.

A toggle button for the camera lights themselves exists. When toggled, will just turn the lights on to say that the camera 204 is on and the Wi-Fi is working. Toggle it again and the indicator lights will turn off. The toggle doesn't affect how the camera system 100 is working, instead just shows the indicator lights.

The mobile app 136 also supports a two finger zoom, two fingers on the screen and then spread them apart, the mobile app 136 will know to zoom in. And then put a finger on it, on the screen and drag it around to change the orientation of the live view on the mobile device 132 where an example is shown between FIG. 7A (vertical orientation of the GUI 704) which still shows other elements of GUI 704 and FIG. 7B with GUI 708 being in a horizontal orientation, and much larger. The user can then choose to lock the current orientation so the zoom and frame do not reset once closed out of the mobile app 136.

In the middle top there's a little button for a screen resolution. Users can also choose the resolution the camera 204 will project to the mobile device 132.

Figure 5:
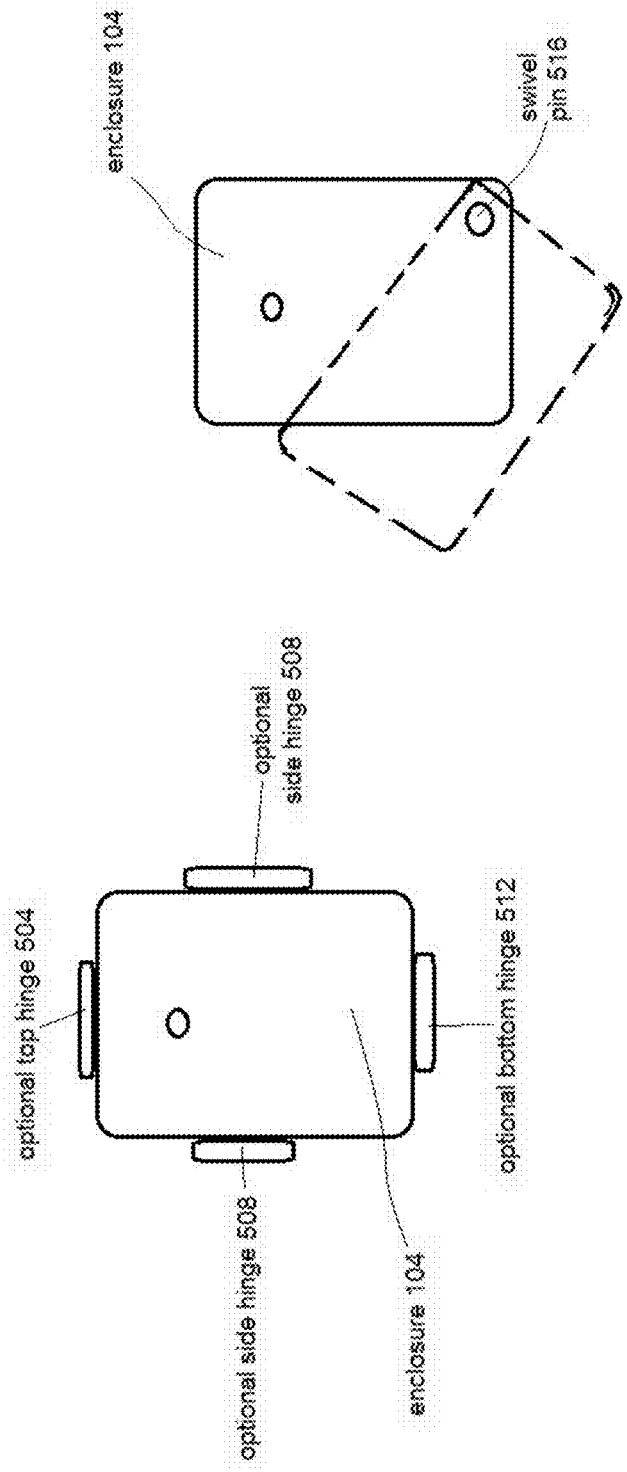
FIG. 5A shows some alternate arrangements of hinges for attaching the enclosure.
FIG. 5B shows the enclosure with a swivel.

FIG. 5A shows some alternate arrangements of hinges 124. The hinge 124 can be located to any side of the enclosure 104, for example, the hinge 504, 508, or 512 shown in FIG. 5A. If a user, knowing their own specific door-geography, wants the enclosure 104 to swing up, down, left, or right they would have the option to select that when they order the camera. FIG. 4 shows a stage of installation where the enclosure 104 is not yet attached, and where part of the anchor pad 420 is shown. This anchor pad 420 lets users line up the peephole properly. The anchor pad itself will have a little half circle 424 on the top, to be coordinated with the positioner 108, to allow the user to line up the camera 204 with the peephole. The camera 204 would then be in-line with the peephole without needing the user to take apart the enclosure 104 to properly line it up.

Another potential usage is shown in FIG. 5B. From FIG. 5B, the enclosure 104 could have a swivel 516, and moved out of the way via swiveling rather than hinge as shown in either FIG. 5A or FIG. 1A. A swivel version would be an advantageous option, swiveling down like a night vision goggle for a soldier but instead the hinge swivels down to position the camera itself over the peephole. So the camera lens 208 is always facing the door but it is moved out of the way of the peephole or over the peephole as the user desires.

Regarding security of the camera system 100, there are increasing worries with network security and IOT. The camera system 100 has its own IP address and connects to the internet through a router or mobile hotspot. Since the camera system 100 is only communicating with the mobile app 132, shouldn't be the source of a virus that would lead to a network being compromised. The camera 204 itself has a password PIN that needs to be entered before someone can gain access. So if someone was driving around and looking for networks to access, the camera system 100 would not show up. It is part of a private network and requires additional credentials to be entered before anyone could access it, or even be aware of it.

In regard to other DDOS attack mitigation, the camera system 100 should only be communicating with the mobile app 136 (or desktop app). Protocols exist where any other Internet activity besides communication with the app 136 will shut the camera system 100 down and warn the user of a possible compromise. In a worst-case scenario, e.g. in the event of the camera system 100 being compromised in the way a hacker could then see what the camera is seeing, the camera system 100 is only aimed out of the door into the apartment hallway so such a hacker cannot see into the apartment itself.

The peephole has a rounded bulge kind of a fisheye effect but not drastic enough to really negatively affect the picture. The lens 208 is inserted into the peephole until the picture is adequate. Most peepholes have a 12 mm or ½ inch diameter the camera lens is roughly 8 mm in diameter, so it fits no problem. Toward the glass part of the peephole the diameter can reduce due to where the peephole screws together. The lens 208 is not likely to touch the glass but due to e.g. protective tape and the plastic composition of the lens 208, the glass or the peephole is not likely to be scratched.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

The invention claimed is:

1. A method of manufacturing and installing a camera system, comprising:
   fabricating an enclosure to be suitable for being fastened to a peephole of a door;
   configuring a back cover to match with and be fastened to the enclosure;
   manufacturing an anchor to be available for attaching the enclosure system to the door;
   a hinge connecting the enclosure to the anchor;
   attaching the anchor to the door via a fastening mechanism;
   attaching the hinge and enclosure to the anchor;
   forming a positioner comprising two concentric lower and upper cylinders, where the lower cylinder is wider than the upper cylinder;
   configuring a portion of the positioner to protrude through the back cover;
   locating the positioner within the enclosure such that the positioner aids a user in guiding a camera toward the peephole;
   configuring a mobile app to facilitate connecting the camera system to a home's Wi-Fi;
   the mobile app having a GUI for facilitating setting an alert-disabled time period, where the motion detector may trigger but the alerts are available at predetermined times and screening or disabling alerts at other predetermined times;
   during alert-enabled periods, the camera system sending alerts during the day via a push notification GUI which shows up on the mobile device; and
   the GUI posting user-configurable language where users can click into the alert, open it up and read it, and delete the alert.

2. The method of claim 1, further comprising:
   manufacturing the lower and upper cylinders using materials that remain pliable and yet hold their physical position.

3. The method of claim 1, further comprising:
   manufacturing the lower and upper cylinders using materials that retain a memory of their physical position and physical shape.

4. The method of claim 3, further comprising:
   fabricating the enclosure and positioner to be suitable for holding and retaining a user's position-selection for the camera body after the user has removed their fingers from the positioner.

5. The method of claim 1, further comprising:
   configuring the positioner with elastic releasable mini-pincers for grasping a body of the camera.

6. The method of claim 5, further comprising:
   the clasping pincers grasping the lens of the camera; and
   the pincers never securing the camera system into place.

7. The method of claim 1, further comprising:
   fabricating the enclosure and positioner to be suitable for fitting the camera snugly against the peephole.

8. The method of claim 1, further comprising:
   configuring the mobile app for facilitating users connecting a specific camera system by going to a device settings menu-option GUI and linking that specific camera system to a known Wi-Fi network.

9. The method of claim 1, further comprising:
   upon the user selecting the specific camera system, the mobile app providing a user with ability to select that specific camera system from a list within a menu of available devices, the user then creating a password for that specific camera system.

10. The method of claim 1, further comprising:
    the mobile app providing a GUI for a user viewing output of the camera system remotely via the mobile device.

11. The method of claim 1, further comprising:
    the camera system performing both still image capture and video capture.

12. The method of claim 1, further comprising:
    facilitating users taking the camera system off their door and bringing the camera system into a hotel room and re-attaching the camera system to an unfamiliar door.

13. The method of claim 12, further comprising:
    transporting the camera body, hinge, and enclosure all together in a single package.

14. The method of claim 1, further comprising:
    the camera comprising four main components, a camera lens, a micro controller acting as the brain for the camera, a camera body, and a Wi-Fi transmitter.

15. The method of claim 14, further comprising:
    forming the camera using an endoscope-cam.

16. The method of claim 1, further comprising:
    the mobile app enabling alerts generated by the motion detector to allow a user to set alarm or motion detection alert settings.

17. The method of claim 16, further comprising:
    the mobile app providing a sensitivity setting for the motion detector.

18. The method of claim 1, further comprising:
    the mobile app facilitating a toggle button for indicator lights indicating the camera is on and the Wi-Fi is working, and if toggled off, the indicator lights giving no indication and being disabled.

19. The method of claim 1, further comprising:
    configuring protocols such that within the camera system, any internet activity besides communication with the mobile app shutting down the camera system entirely; and then
    warning the user of a possible compromised network or device.

20. The method of claim 1, further comprising:
    configuring the positioner to be movable; and
    a user visually adjusting the quality, lighting, and resolution of the image obtained by the camera in real-time by adjusting the positioner while simultaneously viewing the obtained image obtained and displayed through the mobile app.

21. The method of claim 1, further comprising:
configuring the back cover to be attached to the enclosure by a swivel;
a user swiveling the back cover out of the way and not in full contact with the enclosure;
the user moving the positioner out of the way of the peephole, and
the user manually using the peephole by putting their eye near to the unobstructed peephole.

22. The method of claim 1, further comprising:
arranging that the image travels through the peephole directly to the camera in a straight linear path.

23. The method of claim 1, further comprising:
configuring the enclosure to be attached to the anchor by a hinge;
a user hinging the enclosure out of the way and granting unobstructed access to the peephole; and
the user manually using the peephole by putting their eye near to the unobstructed peephole.

24. The method of claim 1, further comprising:
attaching the anchor to the door without clamping.

* * * * *